US008145945B2

(12) United States Patent
Lee

(10) Patent No.: US 8,145,945 B2
(45) Date of Patent: Mar. 27, 2012

(54) PACKET MIRRORING BETWEEN PRIMARY AND SECONDARY VIRTUALIZED SOFTWARE IMAGES FOR IMPROVED SYSTEM FAILOVER PERFORMANCE

(75) Inventor: Hyoungjoo Lee, Highlands Ranch, CO (US)

(73) Assignee: Avaya Inc., Basking Ridge, NJ (US)

( * ) Notice: Subject to any disclaimer, the term of this patent is extended or adjusted under 35 U.S.C. 154(b) by 61 days.

(21) Appl. No.: 12/651,554

(22) Filed: Jan. 4, 2010

(65) Prior Publication Data

US 2011/0167298 A1 Jul. 7, 2011

(51) Int. Cl.
*G06F 11/00* (2006.01)
(52) U.S. Cl. .......................................................... 714/15
(58) Field of Classification Search .................. 714/1–3, 714/4.1, 4.11, 4.12, 4.2, 4.21, 4.3, 4.4, 6.12, 714/6.13, 10–13, 15, 16, 21, 43
See application file for complete search history.

(56) References Cited

U.S. PATENT DOCUMENTS

| | | | |
|---|---|---|---|
| 6,594,229 B1 * | 7/2003 | Gregorat | 370/219 |
| 7,047,379 B2 * | 5/2006 | Boyd et al. | 711/162 |
| 7,065,673 B2 * | 6/2006 | Subramaniam et al. | 714/13 |
| 7,194,652 B2 * | 3/2007 | Zhou et al. | 714/4.4 |
| 7,373,543 B1 | 5/2008 | Jain et al. | |
| 7,739,403 B1 * | 6/2010 | Balakrishna et al. | 709/242 |
| 2007/0174484 A1 * | 7/2007 | Lussier et al. | 709/238 |
| 2007/0180308 A1 * | 8/2007 | Zohar et al. | 714/6 |
| 2007/0283186 A1 * | 12/2007 | Madnani et al. | 714/6 |
| 2008/0077686 A1 | 3/2008 | Subhraveti | |
| 2008/0109496 A1 | 5/2008 | Holenstein et al. | |
| 2009/0138541 A1 | 5/2009 | Wing et al. | |
| 2009/0254642 A1 | 10/2009 | Geist | |
| 2009/0313311 A1 | 12/2009 | Hoffmann et al. | |

OTHER PUBLICATIONS

Cully, Brendan et al., "Remus: High Availability Via Asynchronous Virtual Machine Replication" Department of Computer Science, The University of British Columbia; available at http://people.cs.ubc.ca/~andy/papers/remus-nsdi-final.pdf, 14 pages.
International Search Report for International (PCT) Patent Application No. PCT/US10/60100, mailed Mar. 7, 2011.
Written Opinion for International (PCT) Patent Application No. PCT/US10/60100, mailed Mar. 7, 2011.

* cited by examiner

*Primary Examiner* — Nadeem Iqbal
(74) *Attorney, Agent, or Firm* — Sheridan Ross P.C.

(57) ABSTRACT

Packet loss at a standby server during failover results when the primary fails. There is currently always some amount of packet traffic that is inbound to the primary that is lost during the failover interval. With existing solutions, this packet loss during failover is inevitable. The problem is that when this information is lost, the standby has the state of the last commit, so the standby will have the state information that is old and representative of system state accurately only to the system state at the time of the last commit. One solution is a method in which all inbound data packets targeted to be delivered to a primary software application, such as a virtualized software application, running in a primary virtual machine, are continuously monitored and copied by a Network Replication Device for simultaneous delivery to a backup image of the software application running on a standby system.

20 Claims, 3 Drawing Sheets

PACKET MIRRORING BETWEEN PRIMARY AND SECONDARY VIRTUALIZED SOFTWARE IMAGES FOR IMPROVED SYSTEM FAILOVER PERFORMANCE

TECHNOLOGICAL FIELD

One exemplary aspect is directed toward improving system failover performance. Even more particularly, one exemplary aspect is directed toward improved system failover performance in High Availability (HA) software environment(s).

BACKGROUND

Replication of software applications using state-of-the-art Virtual Machine (VM) platforms and technologies is a very powerful and flexible way of providing high availability guarantees to software application users. Application vendors can take advantage of VM technology to build reliability into their solutions by creating multiple images (or copies) of the software application running synchronously, but independently of one another. These images can run on the same physical device, e.g., a general purpose application server, or within multiple, decoupled VM containers, or they can be developed across multiple physical computers in decoupled VM containers. Multiple VM replications schemes exists, but in general, VM solutions have a primary software image that delivers software services for users and then a secondary or tertiary backup image at a standby server that can take over for the primary in the event of a failure. The backup images are generally synchronized at discrete time intervals to update the data structures and database of the backup servers to track changes that have taken place since the last time the data synchronization update took place. The synchronization is referred to as "commit" and these solutions provide dramatic improvements in the ability for a software application vendor to guarantee that its users will receive reliable access to the software application services.

In a high availability environments, a primary (active) and secondary (passive) systems work together to ensure synchronization of states either in tight lock step, such as tandem and stratus fault-tolerant systems, or loose-lock step, such as less expensive clusters. Whenever there is a state change at some level of the system, the primary sends the summary state to the secondary which adjusts its state to synchronize with the primary using the summary state. When the primary fails before being able to transmit any information it has accumulated since the last checkpointing, that information is usually locally replayed by the secondary based on the date it is received and tries to synchronize itself before taking over as primary.

SUMMARY

However, there's a critical problem in VM replication of software applications that calls for a solution. That problem is packet loss at the standby server during failover that results when the primary fails. There is currently always some amount of significant packet traffic that is inbound to the primary that is lost during the failover interval. With existing solutions, this packet loss during failover is inevitable. The problem is that when this information is lost, the standby has the state of the last commit, so the standby will have the state information that is old and representative of the system state accurate only to the system state at the time of the last commit.

An existing example of an attempt to overcome this problem is link bouncing. Remus (http://people.cs.ubc.ca/~brendan/papers/remus-nsdi08.df) tried to solve the same problem by buffering the outgoing packets in an active buffer. However, the Remus implementation suffers from a big performance penalty, so it is not usable in most production software environments. In Remus, the main cause of the performance penalty is the transmission of the network packets that are subject to being lost are delayed until the next checkpoint/commit.

Historically, baseline practice for failover with data is the use of checkpoint intervals during which data is made current on the backup servers. However, as discussed above, the available solutions either lose data during a failover, or at best, if they buffer incoming data during failover, they suffer a tremendous performance penalty.

In accordance with one exemplary embodiment, a system or mechanism is constructed that implements a method in which all inbound data network packets targeted to be delivered to a primary software application or system, such as a virtualized software application, running in a primary virtual machine (VM), are continuously monitored and forked or copied by a Network Replication Device or driver (NRD) for simultaneous delivery to a backup image of the software application running on a standby system or VM. This data is forked or copied and delivered by the NRD to the standby application image in real-time or near real time with the goal of achieving reduced or zero application downtime. A second exemplary benefit of the NRD is its ability to enable reduced or zero application performance degradation as result of the packet loss during a failover event. One exemplary embodiment assumes the VM platform/system to which the technology will be applied includes current "state-of-the-art" checkpoint commit and failure detection mechanisms.

With checkpoint commit and failure detection system(s) in place, the basic logic for the network replication NRD techniques can be implemented as a network replication driver implemented fully in hardware and/or software running co-resident on the server or servers that are hosting the software application images and VMs. Alternatively, and perhaps in another exemplary implementation, the NRD could be implemented as a stand-alone "bump-in-the-wire" embedded computing device(s) that are powered and deployed physically independent of the server or servers that host the software application VM images. In the superset case of primary and secondary physical servers hosting primary and secondary virtualized images of the software application, one exemplary embodiment could also include a primary (active) and secondary (standby) NRD.

NRD can run in the active and/or standby server or appliance or at some other location in the network. In accordance with one exemplary embodiment, the active NRD will copy packets arriving at the VM, change the destination address to a standby destination, and forward the packets to the standby server device. In this exemplary embodiment, the standby destination could be a standby DOMO (Domain Zero) location where the system is implemented in a hypervisor environment. However, in general, this location could be anywhere within the system. The standby NRD will buffer the packets as follows:

On checkpoint commit, the standby NRD will clear the buffer network packets up until the commit.

On the failure detection, the standby NRD will deliver the buffer packet to the newly activated standby device for virtual machine.

An exemplary embodiment uses a set of decoupled, bump-in-the-wire buffering devices, with the operation being conceptually identical. In implementation though, the packets are intercepted by the primary "bump" device before arrival at the primary server that is running the primary VM. They are then forked to the secondary bump-in-the-wire for buffering for the backup/standby software image in the event of a failover.

With the bump in the wire implementation, when the primary fails, even if it is a catastrophic hardware failure, the bump devices could ensure none of the inbound traffic to the primary is lost. At failure, the secondary image then could be initiated and start handling traffic with the ability to fully recover the state of the primary because no inbound data to the primary was lost. In addition, performance is not sacrificed because the bump devices are not limited to mirroring data only at discrete, checkpoint commit intervals. As part of this scenario, the secondary bump and the primary bump could, at failover, switch roles, from primary bump to secondary and vice versa. The secondary bump, acting like a primary after the failure, could start mirroring data to what was previously the primary bump, which is now playing the role of the secondary.

Meanwhile, the primary server that failed can get replaced and restarted while both bump devices continue uninterrupted operation. Once the primary server is replaced/restarted the system now can do a recovery "swapback" where the active "backup" server commits state, traffic, and ownership session operations back to the replaced/restarted "primary" server. This would again be possible without losing any state or availability, leveraging once again the two physically separate bump devices.

One exemplary advantage of this approach over prior solutions is that it enables a multi-image, virtualized software application to provide continuous and uninterrupted services to software application users even in the face of a catastrophic primary hardware or software image failure.

Another exemplary aspect is directed towards the decoupling of the handling of inbound traffic to a virtualized software image from the primary operation of that virtualized software application. Additionally, further interesting aspects can be found in the idea of physically decoupling this traffic handling onto a set of independently deployed bump-in-the-wire devices that perform this coordinated buffering operation.

Another exemplary embodiment is directed toward network replication in a VM environment, and in particular, VM replication. VM replication, which stores in buffers one or more of network information, application data, and in general any type of data, system data, etc. . . . is becoming a very dominant way of providing high access in virtualized systems. There is one big issue however with VM replication, and yet no perfect solution exists. The exemplary issue is packet loss during failover. Since there is VM downtime during failover, and the standby is typically synchronized at every checkpoint interval, packet loss during failover is inevitable.

Therefore, one exemplary embodiment is to buffer network packets at standby server(s) in real-time. This at least provides a substantial increase in system performance. This assumption is however predicated by the system being provided with checkpoint commit and failure detection by other means.

In accordance with an exemplary embodiment, the basic logic for network replication can be implemented as a network replication driver. The NRD can run in one or more of the active and standby server, and can optionally be located at some other location with a communications or computing network. The active NRD will copy packets coming to the VM, change the destination address to standby address, and send the packets to the standby device or server. The standby NRD will buffer the packets and do the following:

On checkpoint commit, the standby NRD will clear the buffered network packets up until the checkpoint.

On failure detection, the standby NRD will deliver the buffered packets to the newly activated virtual machine.

Another aspect is directed to a technique where rather than buffering outgoing packets, incoming network packets are copied to a standby machine, server, device, or virtual machine. Some of the incoming packets inevitably do not reach the active machine during failover, because that device may not exist at that time. However, the packets are saved in a buffer for the standby machine. After the standby machine takes over, the saved network packets can be re-played to the newly activated machine or virtual machines, so that state loss due to network packet loss is minimized.

More specifically, virtual machine state loss occurs in the following manner. Suppose there is just virtual machine memory replication by checkpointing. At time T, assume the active is in the middle of the $N^{th}$ checkpointing. The standby has the state of the last checkpoint which is N−1. During the current $N^{th}$ checkpointing, the active VM receives one packet called "lost-packet" from a client that acknowledges this packet then somehow dies before committing the current checkpoint. Then the standby will resume from the state of the last checkpoint N−1. So the newly activated VM has now lost the packet called "lost-packet." According to an exemplary embodiment, the standby can recover the lost packet through replaying or reading the lost packet to recreate the state before failure.

In a high availability environments, a primary (active) and secondary (passive) systems work together to ensure synchronization of states either in tight lock step, such as tandem and stratus fault-tolerant systems, or loose-lock step, such as less expensive clusters. Whenever there is a state change at some level of the system, the primary sends the summary state to the secondary which adjusts its state to synchronize with the primary using the summary state. When the primary fails before being able to transmit any information it has accumulated since the last checkpointing, that information is usually locally replayed by the secondary based on the date it is received and tries to synchronize itself with the external before taking over for primary. It is this latter kind of uncheckpointed data, that an exemplary aspect of the technology replicates to the secondary immediately, instead of holding on to the data and sending the data later from the primary, which leads to two disadvantages:

One is it dominates the send queue and second, causes additional holdup when a check point is sent from the primary, in the case of the Remus-style high availability, it leads to memory resource-drainage from the active primary during times of high activity.

Hence, taking initial overhead of forking the network datagrams early on to the secondary is offset by the benefits of avoiding the disadvantages enumerated above. Of course, when a state-checkpoint message from the primary arrives, these buffered datagrams are thrown away by the secondary after committing that state in itself.

The techniques described herein can provide a number of advantages depending on the particular configuration. These and other advantages will be apparent from the disclosure contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like.

While circuit or packet-switched types of communications can be used with the present system, the concepts and techniques disclosed herein are applicable to other protocols.

Accordingly, the disclosure is considered to include a tangible storage medium or distribution medium and prior art-recognized equivalents and successor media, in which the software implementations of the present technology are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the technology is described in terms of exemplary embodiments, it should be appreciated that individual aspects of the technology can be separately claimed.

The preceding is a simplified summary of the technology to provide an understanding of some aspects thereof. This summary is neither an extensive nor exhaustive overview of the technology and its various embodiments. It is intended neither to identify key or critical elements of the technology nor to delineate the scope of the technology but to present selected concepts of the technology in a simplified form as an introduction to the more detailed description presented below. As will be appreciated, other embodiments of the technology are possible utilizing, alone or in combination, one or more of the features set forth above or described in detail below.

BRIEF DESCRIPTION OF THE DRAWINGS

The exemplary embodiments will be described in detail, with reference to the following figures, wherein.

DETAILED DESCRIPTION

An exemplary embodiment of the technology will be described below in relation to a system failover environment. Although well suited for use with VM's, the exemplary aspects are not limited to use with any particular type of device or configuration of system elements and those skilled in the art will recognize that the disclosed techniques may be used in any environment in which it is desirable to provide system failover recovery.

The exemplary systems and methods will also be described in relation to software, modules, and associated hardware and network(s). In order to avoid unnecessarily obscuring the present disclosure, the following description omits well-known structures, components and devices that may be shown in block diagram form, are well known, or are otherwise summarized.

For purposes of explanation, numerous details are set forth in order to provide a thorough understanding of the present technology. It should be appreciated however, that the technology may be practiced in a variety of ways beyond the specific details set forth herein.

A number of variations and modifications can be used. It would be possible to provide or claims for some features of the technology without providing or claiming others.

The exemplary systems and methods have been described in relation to system failover improvements. However, to avoid unnecessarily obscuring the present disclosure, the description omits a number of known structures and devices. This omission is not to be construed as a limitation of the scope of the claims. Specific details are set forth to provide an understanding of the present technology. It should however be appreciated that the technology may be practiced in a variety of ways beyond the specific detail set forth herein.

Furthermore, while the exemplary embodiments illustrated herein show various components of the system collocated; certain components of the system can be located remotely, at distant portions of a distributed network, such as a LAN, cable network, and/or the Internet, or within a dedicated system. Thus, it should be appreciated, that the components of the system can be combined in to one or more devices, such as a gateway, or collocated on a particular node of a distributed network, such as an analog and/or digital communications network, a packet-switch network, a circuit-switched network or a cable network.

Figure 1:
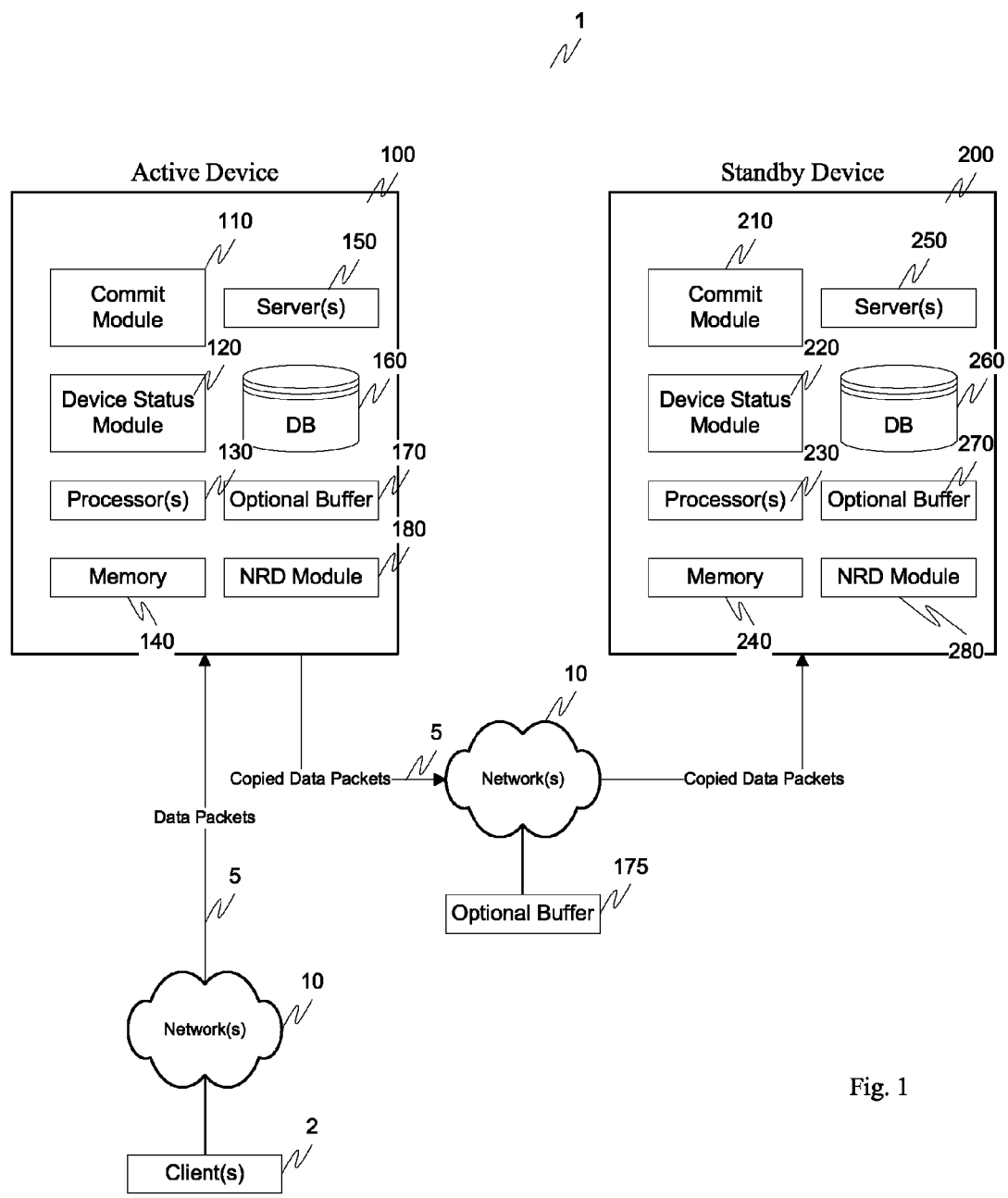
FIG. 1 illustrates an exemplary failover system.

FIG. 1 outlines an exemplary computing environment 1. The computing environment 1 includes an active device 100, a standby device 200, connected by one or more networks 10 and links 5. Each of the active device 100 and standby device 200 include a commit module (110, 210), a device status module (120, 220), processor(s) (130, 230), memory (140, 240), servers (150, 250), database(s) (160, 260), an optional buffer (170, 270), and an NRD module (180, 280) connected via one or more networks 10 and links 5. The optional buffer 175 can also be located anywhere within a computing environment 1 with the device that is currently active typically receiving data packets from one or more clients 2 via networks 10 and links 5.

In operation, a primary system is activated (active device/system). In accordance with the first exemplary embodiment, the active device is device 100 with standby device being device 200. In cooperation with the commit module 110, at predetermined times, the commit module 110 performs a commit thereby preserving state of the active device 100. (See FIGS. 2-4) Upon completing this commit, and in cooperation with the processor 130 and optional buffer 170 or 175, all inbound data packets from clients 2 are copied to the standby device 200. These packets can be stored in one or more of the buffer itself, or for example, in database 260. More particularly, the NRD module 180 monitors all incoming data packets from clients 2 which are continuously monitored and forked or mirrored by the NRD module 180 for simultaneous delivery to the standby device which maintains a backup image of the software application(s) running in the active device 100. These data packets can be forked and delivered by the NRD module 180 to the standby device 200 in real-time with one exemplary goal of it achieving reduced or zero application down time between the two devices.

As discussed, the NRD module 180 can be realized in hardware or software running co-resident on, for example, the device or server(s) that are hosting the software application and VMs images. In another exemplary embodiment, the NRD can be implemented as stand alone "bump-in-the-wire" embedded computing device that is provided and deployed physically independent of the server or servers that host the software application via images.

In the event of a failure, standby device 200, in cooperation with processor 230 and device status module 220, replays the copied packets to restore from the last commit to the current state. Then, processing is able to continue from the fail over point without a loss of data packets. At this point, the standby device 200 is now the "active device" and acts as the primary system until the failed active device 100 is restored and brought back online. Once the failed active device 100 is replaced/repaired/restarted, the system can optionally do a recovery "swap back" where the active standby device 200 commits state, traffic and ownership possession operations back to the replaced/repaired/restarted active device 100. Again, this is possible without loss of state or data packets.

Figure 2:
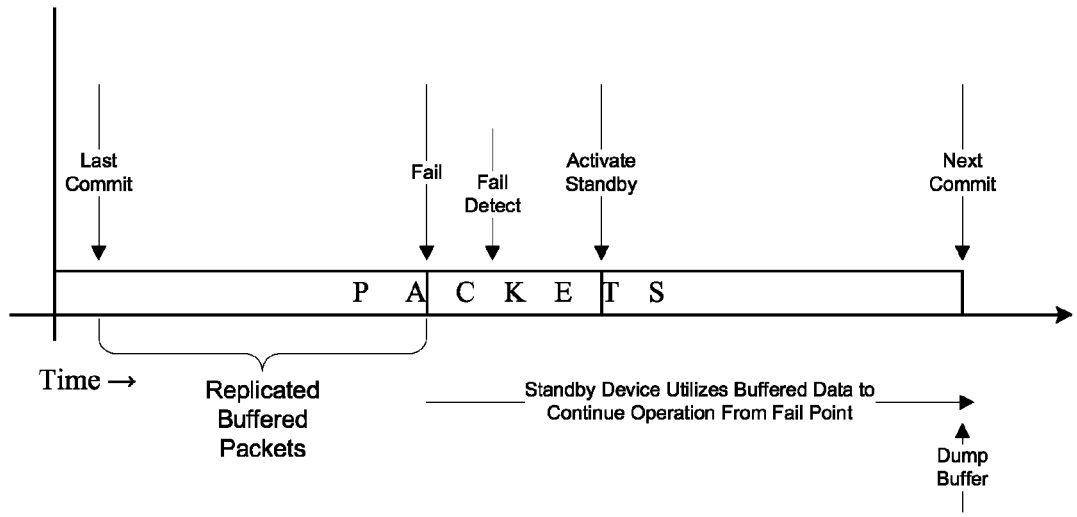
FIGS. 2-4 illustrate exemplary timing diagrams.
Figure 3:
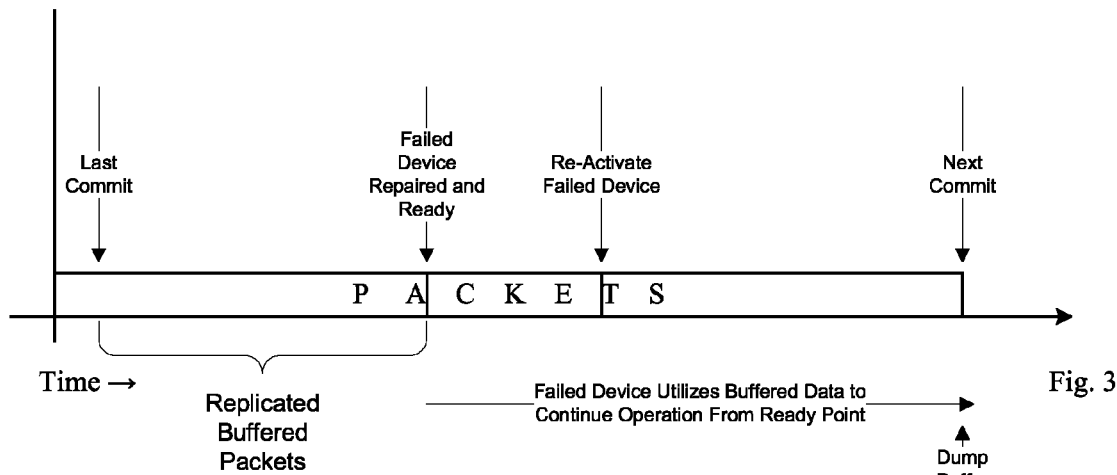
Figure 4:
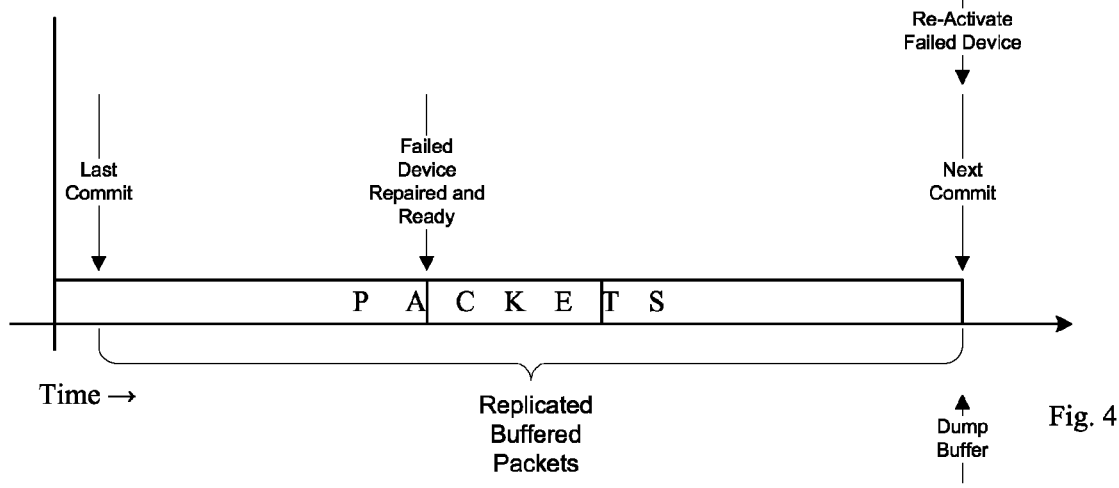

FIG. 2 outlines an exemplary timing diagram highlighting the point and time where the last commit is made, the period during which replicated buffered packets are stored, and a point in time which the standby utilizes the buffered data to continue operations from the failed point. FIGS. 3 and 4 outline the exemplary timelines as to how, after a failure of the active device, various activities occur until the failed device has been re-activated. In general, FIGS. 3 and 4 highlight processes that take place when, for example, the standby device 200 is acting as the "primary or active" device in the event the active device 100 has failed. The processes for . recovery swap back from the standby 200 to the active device 100 are the same as when the active device 100 is the "active or primary" device or system in operation.

As discussed, the buffer (170, 175, 270) can be located at any point within the computing environment 1. In addition, multiple buffers can be provided as needed provided the buffer is able to forward replicated buffered packets to the standby device(s) or system in the event of a failure of the active device. The buffers can also cooperate with one or more of the memories 140, 240 and databases 160, 260 depending on the particular environment of the computing system 1.

Figure 5:
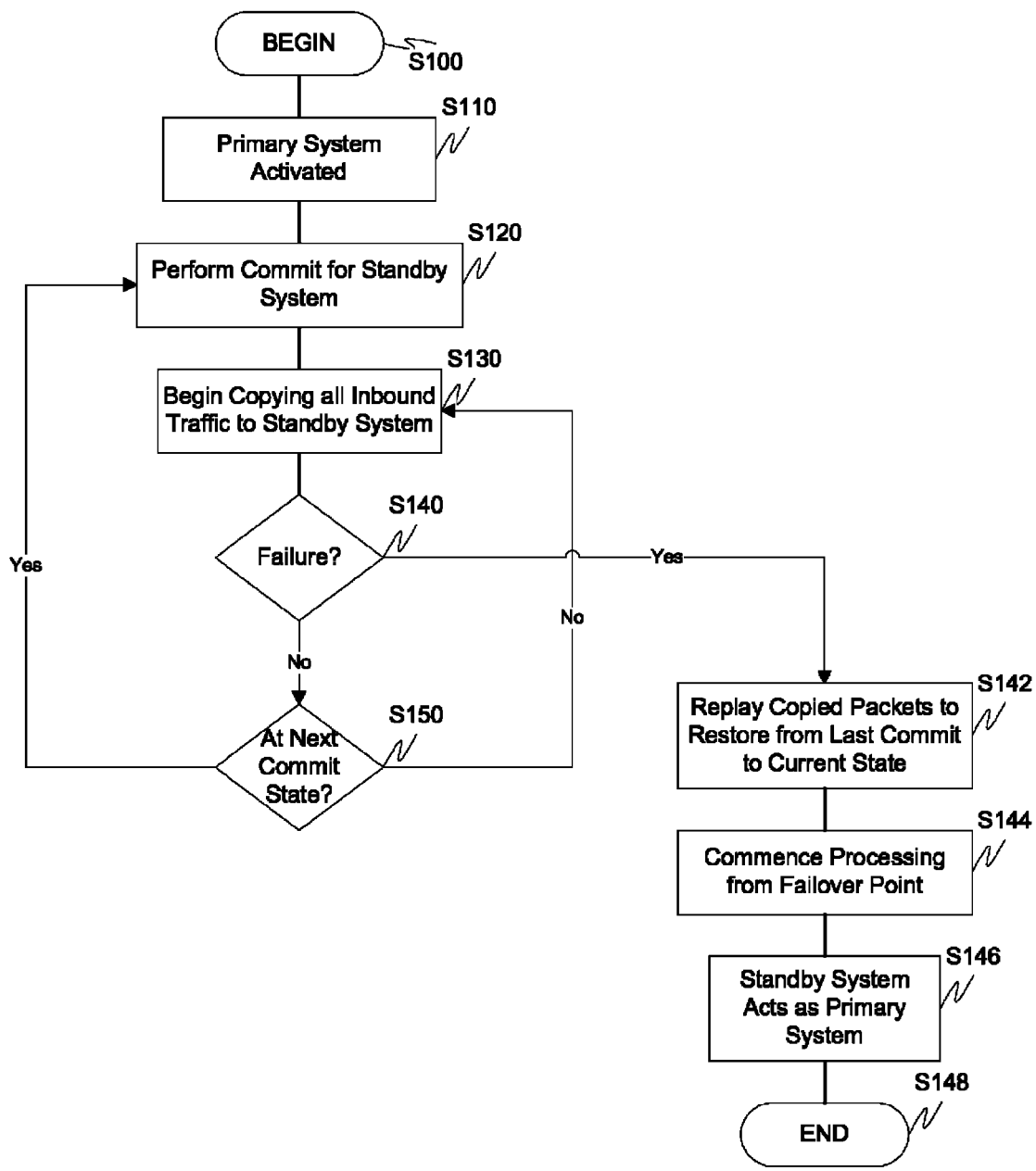
FIG. 5 illustrates an exemplary method of operation of the failover system.

FIG. 5 outlines an exemplary methodology for providing high availability in a software application environment. In particular, control begins in step S100 and continues to step S110. In step S110, a primary system is activated. Next, in step S120, a commit is performed by the primary system to preserve state for a standby system. Then, in step S130, all inbound traffic to the primary system is copied to one or more of a buffer or the standby system. Control then continues to step S140.

In step S140, a determination is made whether a failure has occurred. If a failure has occurred, control jumps to step S142. Otherwise, control continues to step S150.

In step S150, a determination is made whether the next commit state has been reached. If it has been reached, control jumps back to step S120 with control otherwise continuing to step S130.

In step S142, the packets copied for the benefit of the standby system are replayed from the last commit to the current state. Then, in step S144, the standby system is able to commence processing from the failover point without a loss of any data packets. Then, in step S146, the standby system acts as the primary system with control continuing to step S148 where the control sequence ends.

It will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, enterprise system, client-server environment, distributer network including one or more servers, in one or more communications devices, at one or more users' premises, or some combination thereof. Similarly, one or more functional portions of the system could be distributed between a communications device(s) and an associated computing device.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the system.

In yet another embodiment, the systems and methods of this technology can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this technology.

Exemplary hardware that can be used for the present system includes computers, handheld devices and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this technology is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a computer readable storage medium, executed on programmed general-purpose computer with the cooperation of a controller and memory, a special purpose computer, a microprocessor, or the like. In these instances, the systems and methods of this technology can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the present technology after understanding the present disclosure. The present technology, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the technology are grouped together in one or more embodiments, configurations, or aspects for the purpose of streamlining the disclosure. The features of the embodiments, configurations, or aspects of the technology may be combined in alternate embodiments, configurations, or aspects other than those discussed above. This method of disclosure is not to be interpreted as reflecting an intention that the claimed technology requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment.

Moreover, though the description of the technology has included description of one or more embodiments, configurations, or aspects and certain variations and modifications, other variations, combinations, and modifications are within the scope of this disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method for preserving state and reducing data loss comprising:
    upon detecting a commit in an active device, continuously copying all inbound data traffic before receipt at the active device to one or more buffers associated with a standby device until a next commit or failure, wherein the copied inbound data traffic has a destination address changed to that of the standby device;
    detecting a failure; and
    replaying copied data traffic to restore the standby device to a current state of a failed device.

2. The method of claim 1, further comprising commencing processing at the standby device from a failover point.

3. The method of claim 1, further comprising deleting all copied inbound data traffic at the next commit.

4. The method of claim 1, further comprising performing a swap back from the standby device to the active device.

5. The method of claim 1, wherein the active device is one or more of one or more virtual machines, servers and computers.

6. The method of claim 1, wherein the standby device is one or more of one or more virtual machines, servers and computers.

7. The method of claim 1, wherein a network replication device performs the copying.

8. The method of claim 7, wherein the network replication device is positioned upstream of the active device.

9. A plurality of means for performing the steps of claim 1.

10. A non-transitory computer-readable information storage media having stored therein instructions that when executed by one or more processors cause the steps of claim 1 to be performed.

11. A system that preserves state and reduces data loss comprising:

upon detecting a commit by a commit module in an active device, a network replication module continuously copies all inbound data traffic before receipt at the active device to one or more buffers associated with a standby device until a next commit or failure, wherein the copied inbound data traffic has a destination address changed to that of the standby device;

a device status module that detects a failure; and a second device status module that replays copied data traffic to restore the standby device to a current state of a failed device.

12. The system of claim 11, wherein processing at the standby device commences from a failover point.

13. The system of claim 11, wherein all copied inbound data traffic is deleted at the next commit.

14. The system of claim 11, wherein the standby device is swap back to the active device upon correction of the failure.

15. The system of claim 11, wherein the active device is one or more of one or more virtual machines, servers and computers.

16. The system of claim 11, wherein the standby device is one or more of one or more virtual machines, servers and computers.

17. The system of claim 11, wherein the network replication device performs the copying to the one or more buffers, the one or more buffers collocated with one or more of the active device, the standby device or located on a network node.

18. The system of claim 17, wherein the network replication device is positioned upstream of the active device.

19. The system of claim 17, wherein the network replication device is positioned upstream of the standby device.

20. The system of claim 11, wherein all inbound data traffic targeted to be delivered to a primary software application running in a primary virtual machine on the active device are continuously monitored and copied by the network replication module for simultaneous delivery to a backup image of the software application running on a standby system or virtual machine.

* * * * *